United States Patent [19]

Phillips

[11] 4,091,848
[45] May 30, 1978

[54] SAFETY WARNING SYSTEM FOR AN LP GAS TRANSPORT VEHICLE

[76] Inventor: Hedrick M. Phillips, 905 Merwin Rd., Raleigh, N.C.

[21] Appl. No.: 568,513

[22] Filed: Apr. 16, 1975

[51] Int. Cl.² .............................................. B65B 57/18
[52] U.S. Cl. ...................................... 141/94; 137/351; 141/392; 180/82 R
[58] Field of Search ................... 137/551, 351; 141/84, 141/94, 98, 325, 326, 346, 379, 392; 200/61.42, 61.44, 331; 222/23, 41; 180/82 R, 103 BF; 280/50; 340/23

[56] References Cited

U.S. PATENT DOCUMENTS

| | | | |
|---|---|---|---|
| 2,847,023 | 8/1958 | Hansen et al. | 137/351 |
| 2,871,872 | 2/1959 | Rowles | 137/351 |
| 3,510,837 | 5/1970 | Lepore et al. | 200/61.44 |
| 3,789,357 | 1/1974 | Fritz | 200/61.44 X |
| 3,908,718 | 9/1975 | Bower | 141/98 X |

Primary Examiner—Richard E. Aegerter
Assistant Examiner—Frederick R. Schmidt
Attorney, Agent, or Firm—Mills and Coats

[57] ABSTRACT

The present invention relates to a safety warning system for an LP (liquefied petroleum) gas or other hazardous material transporting vehicle or the like, wherein said safety warning system appraises the vehicle's operator of the possibility of a hose connection extending between a tank carried on the transport vehicle and a second remote main supply or customer's tank.

8 Claims, 7 Drawing Figures

SAFETY WARNING SYSTEM FOR AN LP GAS TRANSPORT VEHICLE

The present invention relates to LP gas vehicles and the like and more particularly to a safety warning system therefor that is designed to appraise the vehicle's operator of the possibility of a hose connection existing between a tank carried on the vehicle and a second remote stationary tank.

The hazards and dangers of LP gas are appreciated by much of the general public and especially those in the industry who have seen examples of fire and explosions that have resulted in great property damage and even the loss of human lives. LP gas can be transported and handled safely, but there always exist the careless individual operator and the individual who is normally careful but due to the factor of occasional human error, the normal careful individual sometimes fails to take proper precautions and to proceed in a safe and prudent manner when dealing with LP gas. It is in these latter cases that LP gas becomes dangerous and presents a threat to life and property.

One particular area of handling LP gas that has been especially hazardous and the seen of much property damage is that phase of handling LP gas where there is being a transfer of gas between two tanks, particularly the tank on the transport vehicle and a second stationary tank such as a main supply tank or the customer's tank. Here the major problem is that by carelessness, human error, or whatever, the operator of the vehicle, drives the transport vehicle away from the stationary tank while there is a hose connection between the stationary tank and the tank on the transport vehicle. Obviously this results in property damage to the tanks and the associated pumping and supporting machinery. Moreover, where there is a spillage of gas and a spark in the surrounding area is present from a match, cigarette or even the exhaust from an automobile engine, this can set off an explosion and resulting fire. Often in these cases, the transport vehicle and any surrounding property is reduced to rubbage, and it is not uncommon for surrounding individuals to be seriously injured or even killed.

The present invention provides a safety warning system for such an LP gas transport vehicle that produces a signal (light or alarm or both) that indicates to the operator of the vehicle that there is a possibility that one or more hoses are still connected between the tank on the vehicle and the adjacent stationary tank. Specifically, an electrical circuit is provided with signal means therein, and once the electrical circuit is energized by a battery, typically the battery of the vehicle, the signal means is actuated unless the delivery hose on the transport vehicle is properly positioned or some form of an obstacle is properly positioned.

Basically, in one embodiment, the use of an obstacle means, whether it be in the form of a rod or the delivery hose assembly itself, the signal system is designed such that if the obstacle means is properly placed hose connections are an impossibility, and the proper placement and position of such obstacle means assures that the signal means is not actuated. But if the obstacle means used is not properly positioned after the transfer of gas from one tank to another, there is at least the possibility of a hose connection existing between the tank on the vehicle and the adjacent stationary tank, and the improper positioning of the obstacle means triggers or actuates said signaling means so as to appraise the operator and to remind him to check and make sure that no hose connection exist between the vehicle tank and the adjacent stationary tank.

It is, therefore, an object of the present invention to provide a safety warning system for an LP gas transporting vehicle for appraising or indicating to the operator of the vehicle that a possible hose connection exists between the tank carried on said vehicle and a second stationary tank.

A further object of the present invention is to provide a safety warning system for an LP gas transporting vehicle that will virtually eliminate the dangers and hazards that are presented by the possibility of the vehicle operator driving the vehicle away from a stationary tank while there is a hose connection between the vehicle tank and a stationary tank.

A further object of the present invention is to provide a virtually foolproof safety warning system for an LP gas transporting vehicle that utilizes an obstacle means that is normally positioned to prevent even the possibility of the presence of a hose connection between the vehicle's tank and a remote stationary tank, and further operative when not so normally positioned to actuate signaling means so as to appraise the vehicle's operator of the possibility of a hose connection between the two tanks.

Still a further object of the present invention is to provide a safety warning system for an LP gas transporting vehicle wherein the safety warning system serves to appraise the vehicle's operator of the possibility of a hose connection between a tank carried on the vehicle and second stationary tank, and wherein said safety warning system is simple, relatively inexpensive and reliable.

Other objects and advantages of the present invention will become apparent from a study of the following description and the accompanying drawings which are merely illustrative of the present invention.

BRIEF DESCRIPTION OF THE DRAWINGS

With further reference to the drawings, particularly FIGS. 1-3, an LP gas transporting vehicle is shown therein and indicated generally by the numeral 10. The structure of an LP gas transporting vehicle of the type shown in the accompanying drawings is well known in the art and, therefore, a detailed description thereof and the various auxiliary and supporting structure associated with a tank 12 mounted will not be presented in detail herein because such structure is well known in the art and is not directly material in itself to the present invention. However, in the way of a brief explanation of the conventional structure found on the rear of such an LP gas vehicle, it is seen that the vehicle tank 12 includes opening means indicated generally by the numeral 14 formed therein about the rear portion thereof. The opening means 14 is in the form of two inlets 16, commonly referred to as a liquid inlet and a vapor inlet. As seen in FIGS. 2 and 3, the liquid and vapor inlets 16 have various control valve devices operatively interconnected between the liquid and vapor inlets 16 and the tank 12. Again, such control valve structure is conventional in such types of LP gas transporting vehicles and the detail structure thereof and the manner of use will not be specifically dealt with herein since the same is old in the art and again not material.

Figure 1:
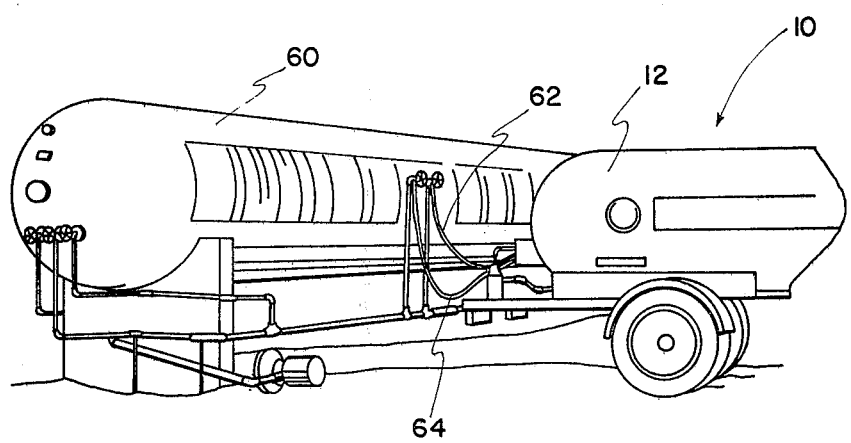
FIG. 1 is a side elevational view of an LP gas transporting vehicle having a gas tank mounted thereon wherein the vehicle is stationed adjacent a second stationary tank (supply or delivery) where gas may be transferred to and from between the two tanks.

Continuing to refer briefly to the conventional structure on the rear of the LP gas transporting vehicle 10, it is seen that there is provided a hose reel assembly, indicated generally by the numeral 20, on the rear of the vehicle bed adjacent the rear end of the tank 12. The hose reel assembly 20 comprises a reel frame 22 having a reel 24 rotatively journaled therein. Operatively connected to the tank 12 for gas delivery purposes is a delivery hose 26 that is reeled or wound around the reel 24 and threaded through a swing arm hose guide 28 that is pivotably mounted to a rear portion of the reel frame 22. Provided on the remote-delivery end of the hose 26 is a conventional hand actuated nozzle 30 that is particularly adapted to be received by the inlet portion of a customer's delivery tank.

In operating the LP gas transporting vehicle 10, it is appreciated that LP gas must be transferred into the tank 12 (as illustrated in FIG. 1) of the vehicle 10 and transferred therefrom via the delivery hose 26 to individual customer's tanks. To transfer into the tank 12 or to fill the tank, the vehicle 10 is stationed adjacent a main supply tank 60 and by the use of a pair of hoses 62 and 64, as illustrated in FIG. 1, gas in both the liquid and vapor state is transferred by the individual hoses through the inlets 16, and on into the tank 12. In the case of the delivery of the LP gas to a customer's tank, the vehicle 10 is stationed adjacent the tank and the hose 26 is reeled from the reel 24 and the nozzle 30 is utilized to transfer the LP gas from the vehicle tank to the customer's tank, referred to herein as a second or stationary tank. The problem presented, as discussed hereinbefore, is that the operator of the vehicle 10, in some cases, would drive the vehicle away from the tank prior to disconnecting the hose.

Figure 6:
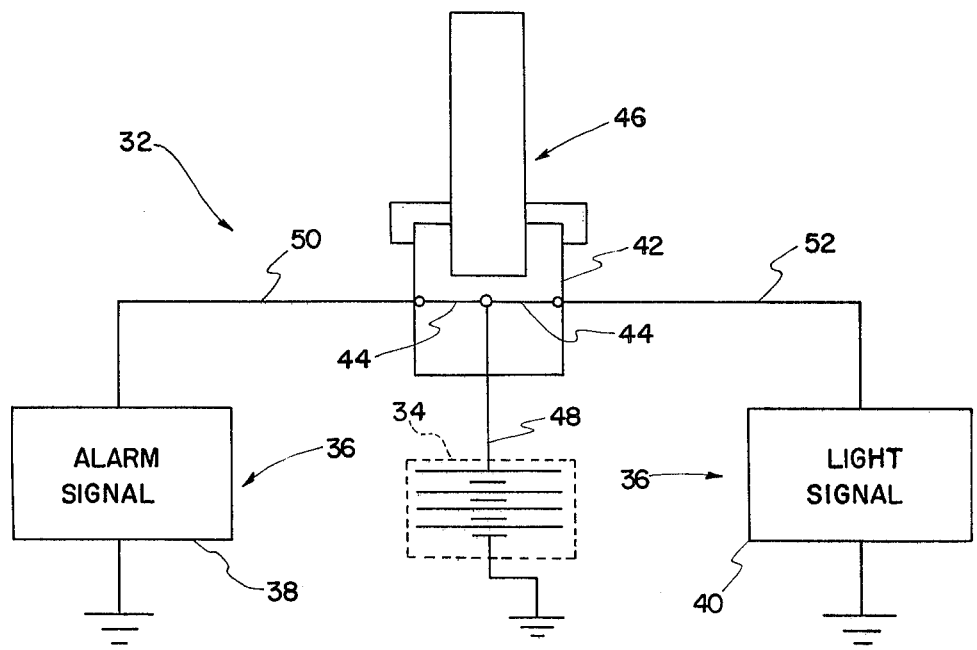
FIG. 6 is an electrical schematic diagram showing the safety warning system of the present invention in the operative mode where the battery energizes and actuates the signaling means connected therein.
Figure 7:
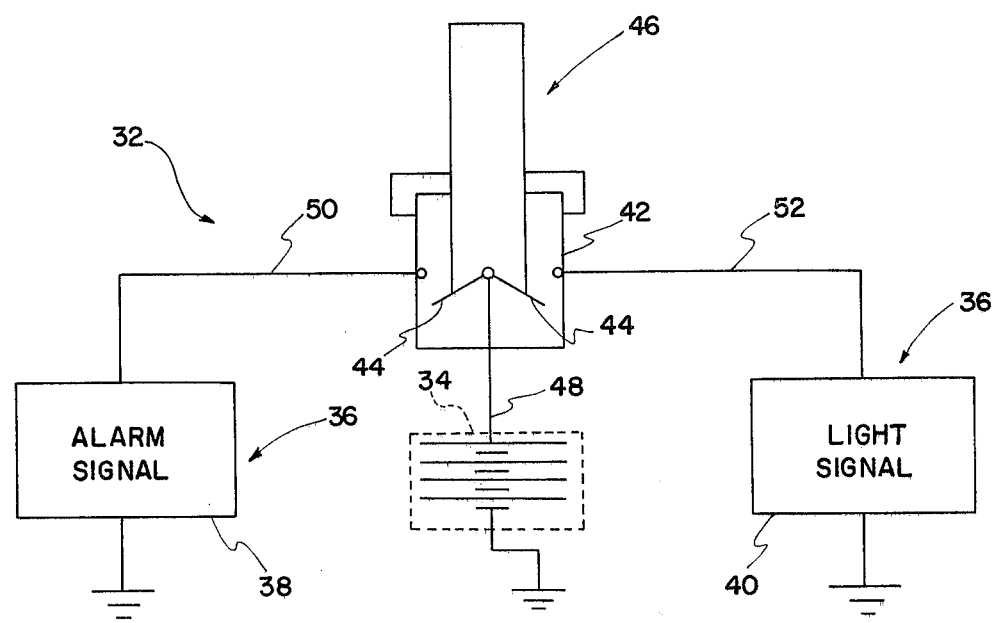
FIG. 7 is also an electrical schematic diagram depicting the safety warning system of the present invention in the normal mode where the obstacle means is properly positioned so as to open the switching means interconnecting either of the signaling devices with the power supply.

To prevent such occurrences, the present invention presents a safety warning system, indicated generally by the numeral 32 and schematically illustrated in FIGS. 6 and 7. The safety warning system 32 appraises or indicates to the operator the possibility of a hose connection existing between the vehicle tank 12 and a second remote stationary tank such as the main supply tank 60 shown in FIG. 1, or a customer's tank.

Figure 5:
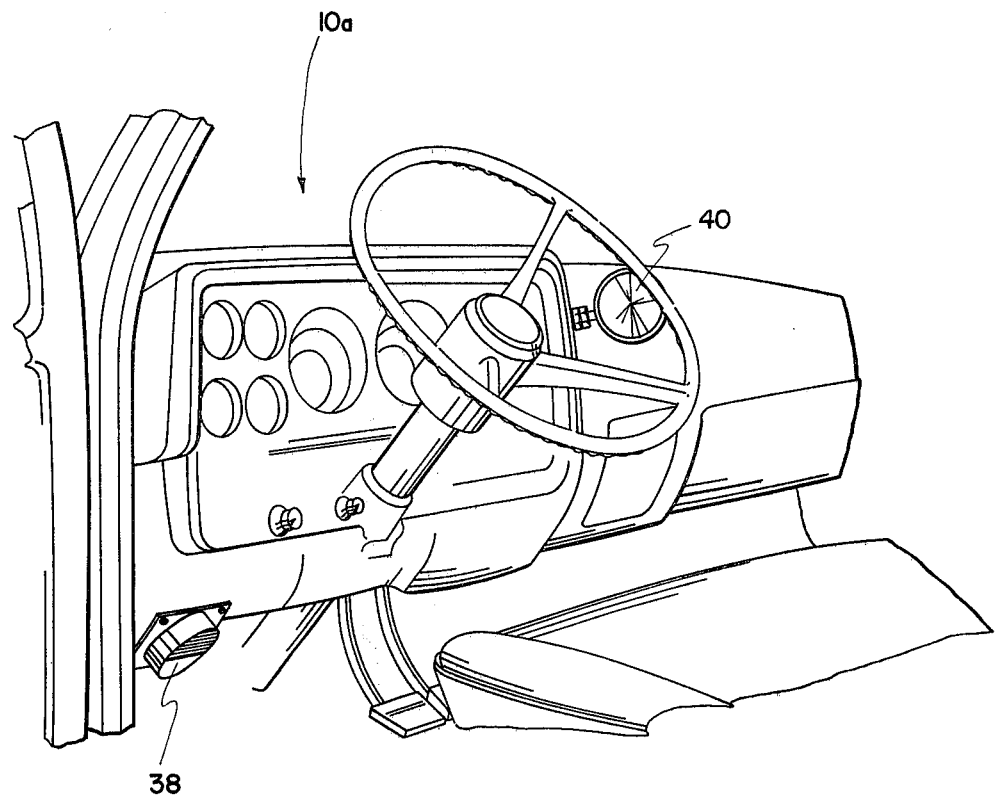
FIG. 5 is a fragmentary perspective view showing the cab of the LP gas transporting vehicle and the signaling means positioned therein.

First, reviewing the schematic illustrations of FIGS. 6 and 7, it is seen that there is provided a power source 34 which is typically the battery of the LP gas vehicle 10, and the battery is operatively connected to signaling means indicated generally by the numeral 36. The signaling means 36 shown therein includes an alarm signal 38 and a light signal 40 and is placed in the vehicle cab area 10a (FIG. 5). In any particular application, the signaling means 36 could be either the audible signal 38 or the light signal (preferably a flashing light signal), or both, depending on the particular wishes of the vehicle's owner. In the case of both an alarm signal 38 and a light signal 40, a battery 34 is connected to a normally closed double switch 44 that is adapted to allow electrical current to move from the battery 34, through both lines 50 and 52, and to the respective signaling means 36. If only one type of signaling means is desired, it would follow that the switching mechanism would only be a single switch.

Figure 2:
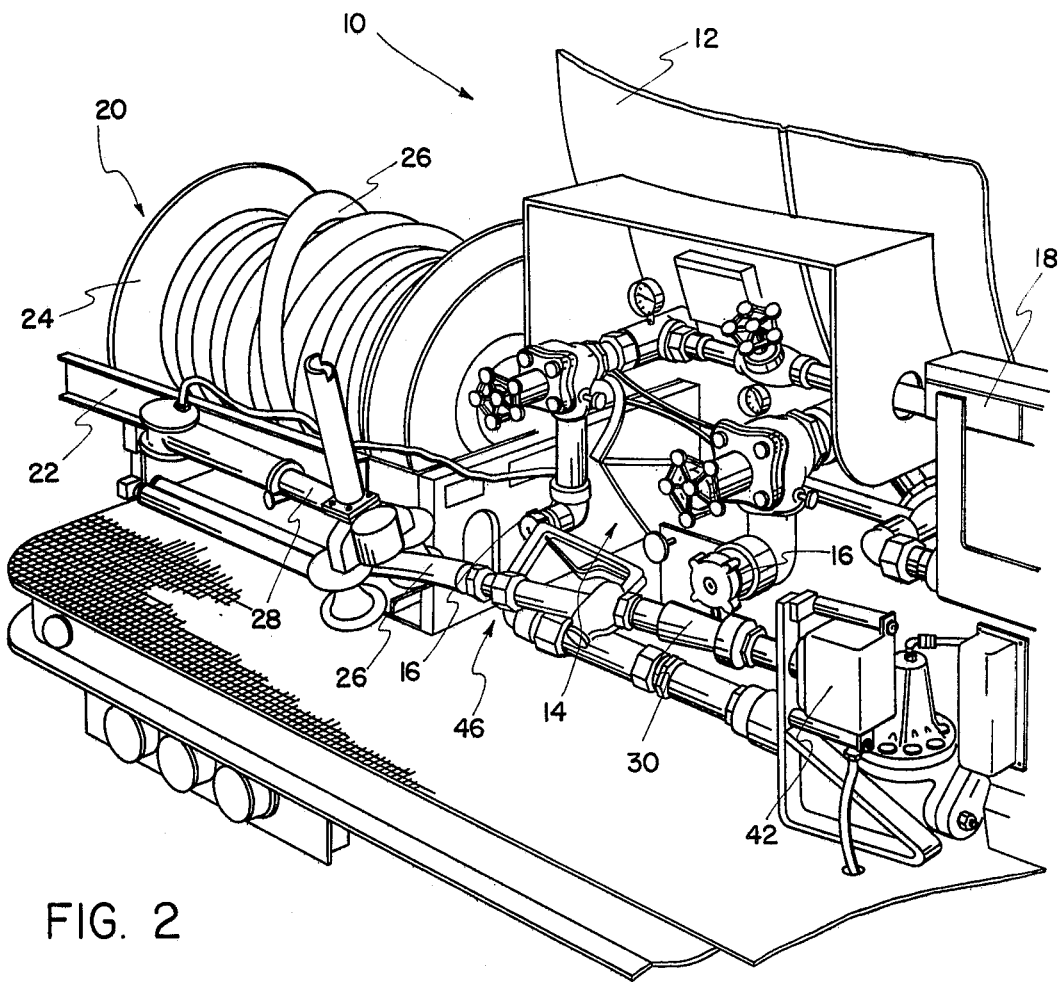
FIG. 2 is a fragmentary rear perspective view of an LP gas transporting vehicle where a portion of the delivery hose assembly shown therein forms a part of the safety warning system of the present invention.
Figure 3:
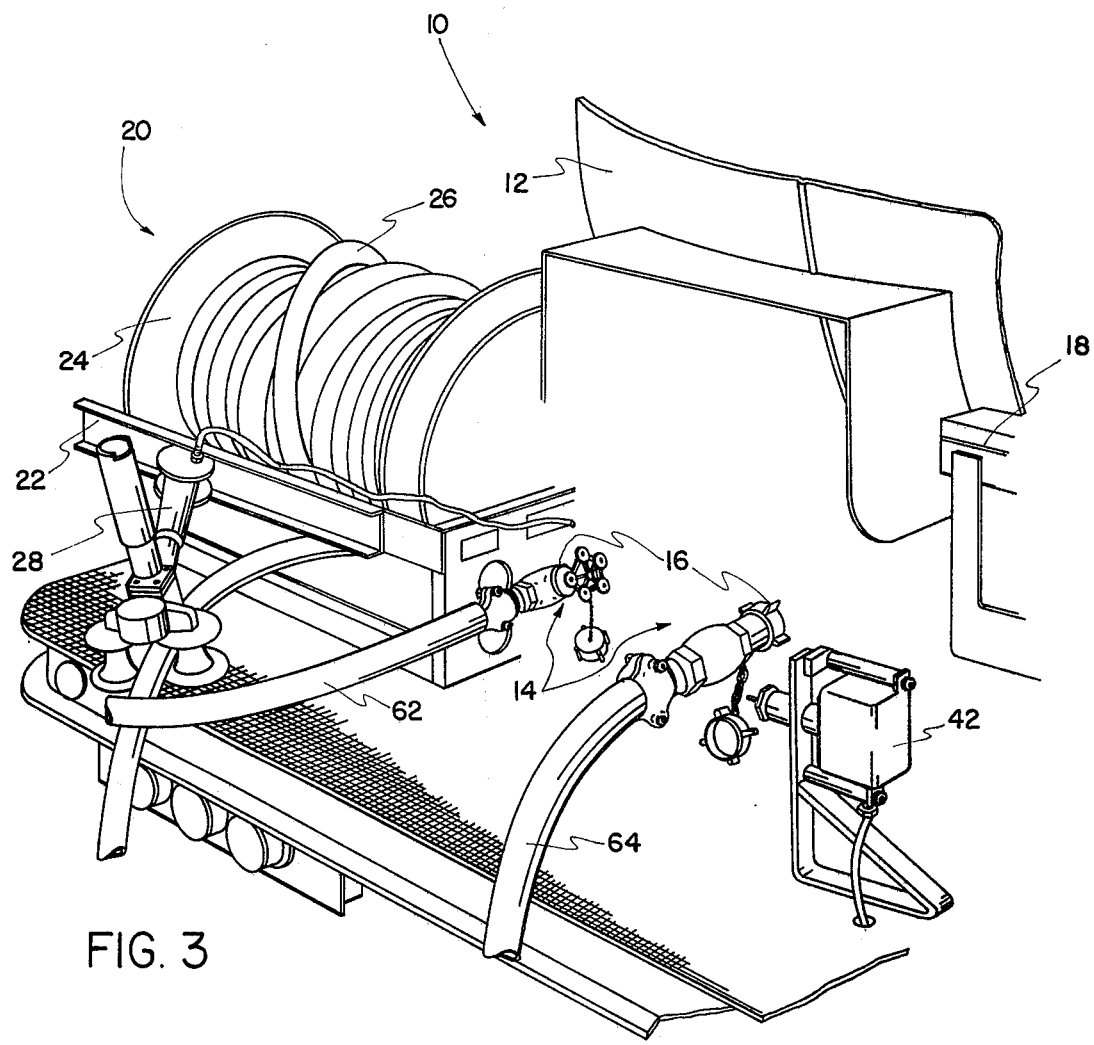
FIG. 3 is a view similar to FIG. 2 except a portion of the delivery hose assembly has been swung from its obstructing position of FIG. 2 to a nonobstructing position such that hose couplings may be conveniently made to a pair of inlet openings formed about the rear of the tank structure on the vehicle.
Figure 4:
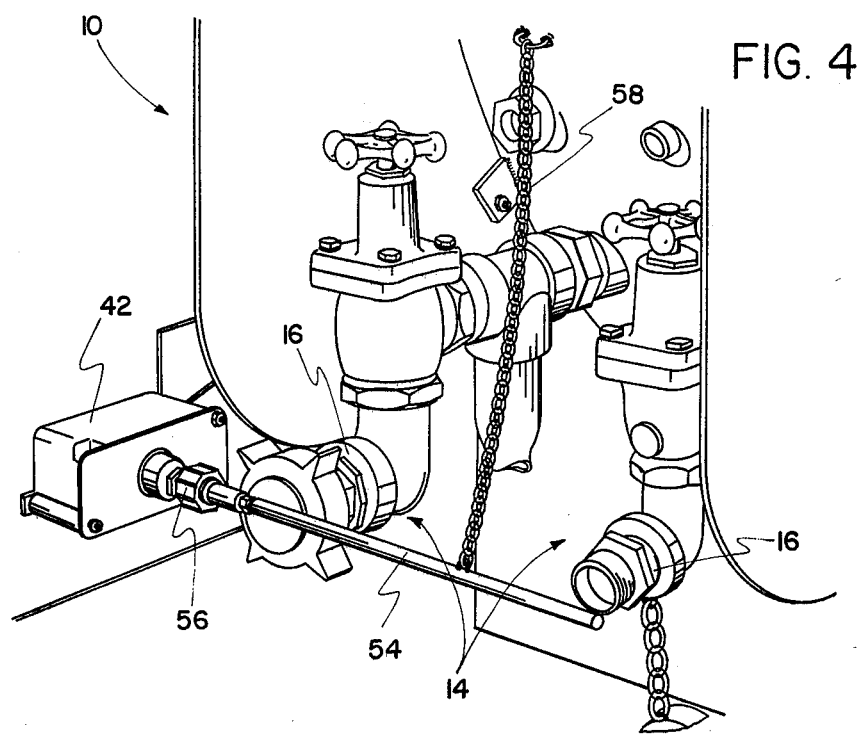
FIG. 4 is an alternate embodiment showing an obstacle means in the form of an elongated rod that extends across in front of two main inlet openings, liquid and vapor, formed about the rear portion of the tank on the LP gas transporting vehicle.

As illustrated in FIGS. 6 and 7, the switching means is contained within a receptacle indicated by the numeral 42 and also shown in FIGS. 2-4. The receptacle 42 is in actuality a receptacle for receiving some object which would open the switching structure 44 and consequently, would prohibit the signaling means 36 from being actuated. Because the receptacle 42 is disposed on the back of the LP gas truck 10, it, of course, would be explosion proof.

In terms of the present invention, to open the switch and to assure that the signaling means 36 is not actuated, the receptacle 42 is adapted to receive an obstacle means 46 that is provided with a conventional form of coupling means that allows the obstacle means 46 to be coupled to the receptacle 42 so as to open the swtich structure 44.

In the case of the embodiment shown in FIG. 2, it is important that the opening means 16 in the form of the vapor and liquid inlets 16 are not connected to the hoses 62 and 64 extending from the supply tank 60 when the vehicle operator is about to drive the vehicle away from that particular tank. Therefore, in accordance with the present invention, the receptacle 42, as viewed in FIG. 2, is placed on the right-hand side of the right-hand extreme inlet 16, and particularly spaced thereto, such that when the nozzle 30 is properly coupled to the receptacle 42 that segment of the delivery hose 26 and nozzle assembly disposed in front of the inlets 16 acts as the obstacle means and effectively prevents either of the hoses 62 and 64 from being coupled thereto. Therefore, it is appreciated that if the nozzle 30 is properly coupled to the receptacle 42 that the switch structure 44 will be opened as shown in FIG. 7, and the signaling means 36 will not be actuated. Consequently, the obstacle means, i.e., the delivery hose assembly passing in front of the inlets 16 (FIG. 2), makes it an impossibility for the hoses 62 and 64 to be coupled to the vapor and liquid inlets 16.

In filling the tank 12 of the LP gas transporting vehicle 10, the nozzle 30 is uncoupled from the receptacle 42 and the swing arm hose guide 28 is pivoted from a position of obstruction (FIG. 2) to a position of nonobstruction (FIG. 3). In the non-obstructing position, the hoses 62 and 64 can be appropriately coupled to the inlets 16 and the vehicle tank 12 can be filled. But, it should be appreciated that by uncoupling the nozzle 30 or the obstacle means 46, that the switching structure 44 is allowed to assume its normally closed position (as illustrated in FIG. 6) and consequently the signaling means would be actuated if the battery 34 was connected in a closed circuit as illustrated in FIG. 6. If the battery 34 is in the vehicle's battery, it could be provided that the vehicle's ignition switch could also be in the circuits illustrated in FIGS. 6 and 7 and that the signaling means, either or both the alarm or light signal, would not be actuated in the cab 10a of the vehicle unless the ignition switch was turned to the "on" position.

Referring to the mode of operation illustrated in FIG. 3, if after the tank 12 has been filled the operator fails to properly position the swing arm hose guide 28 back to the obstruction position of FIG. 2 and to couple the nozzle to the receptacle 42, then the switching structure 44 remains closed and the operator will be appraised of this when he enters the vicinity of the vehicle cab 10a. In essence then, when the nozzle 30 is not properly coupled to the receptacle 42 so as to open the switch structure 44 therein, the operator is appraised that there is at least a possibility that a hose connection exist between the tank 12 and any adjacent stationary tank. Being appraised of this possibility, the operator should always return to the rear of the vehicle 10 and to make sure that the nozzle 30 is properly coupled to the receptacle 42, and when this is done, he is assured that there can be no hose connection between an adjacent stationary tank and the vehicle tank 12 because this is now an impossibility because of the position of the delivery hose 26 and nozzle assembly that extends in front and in close proximity to the inlet openings 16.

In addition, by requiring that the nozzle 30 be coupled to the receptacle 42, this assures that the delivery hose 26 is not connected between the vehicle tank 12 and a customer's tank in a delivery situation. So, therefore, the embodiment illustrated in FIGS. 2 and 3 serves a dual function because it takes care of both possible situations, i.e., the situation where there is a hose connection between a supply tank such as that indicated in FIG. 1 and the vehicle, and where there is a hose connection between the customer's delivery tank and the vehicle tank.

Turning to FIG. 4, there is shown an alternate embodiment of the present invention. In this alternate embodiment, the obstacle means 46, as indicated in FIGS. 6 and 7, is now in the form of an elongated rod 54 that has a coupler 56 that is adapted to couple the elongated rod to the same type of receptacle box 42 referred to in the above discussion. By coupling the elongated rod 52 to the receptacle 42, it is seen that the elongated rod serves as an obstacle in front of the inlets 16 and when properly connected assures that hose means, such as hoses 62 and 64, cannot be coupled to the liquid and vapor inlets 16 extending from the rear of the vehicle's tank 12. Also, it should be pointed out that the elongated rod 54 would be provided with a chain 58, or other suitable means, with a remote end that is fixed at a point thereabove to assure that when the elongated rod 54 is uncoupled that the rod will not be lost or misplaced. Therefore, it should be appreciated that the elongated rod 54 as shown in FIG. 4, is disposed in a position of obstruction and serves the same purpose as the delivery hose shown in the position of obstruction in FIG. 2. And that by uncoupling the elongated rod 54 where the rod is allowed to fall to a non-obstructed position, the switch structure 44 is allowed to assume its normally closed position (FIG. 6) and thereby enables the signaling means, whether it be an audible alarm or a light signal or both, to be actuated.

It should be noted that the obstacle means 46, whether it be a portion of the hose 26 or the elongated rod 54 when coupled to the receptacle 42 acts to open the normally closed switch structure 44. The actuation of such switch structure is conventional and well appreciated. In the present case, the switch structure within the receptacle 42 would be normally biased to the closed position (FIG. 6). Upon coupling the obstacle means 46 to the receptacle 42, such would be effective to engage the switch structure 44 or other structure therewith and causes the switch structure to be moved to the open position (FIG. 7).

Therefore, from the foregoing specification, it can be seen that the safety warning system 32 of the present invention that is particularly adapted for use with LP gas transporting vehicles or other types of vehicles that carry dangerous and hazardous material, is of great value in that it appraises the individual vehicle operators of the possibilituy of a hose connection between the vehicle tank 12 and another adjacent stationary tank, such as a main supply tank 60 as illustrated in FIG. 1, or even the situation where the second tank is a customer's delivery tank. By the utilization of the safety warning system, the chances are virtually eliminated that a vehicle operator will drive the vehicle away from a stationary tank while there is a hose connection between the vehicle tank and that stationary tank without being appraised of the fact or at least of the possibility of such a hose connection.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. In a LP gas transport vehicle or the like of the type having a tank mounted thereon and having opening means operatively associated therewith for filling the tank, the improvement comprising a safety warning system for appraising the operator of the vehicle of the presence of a hose connection between said opening means operatively associated with said vehicle tank and a second tank, said safety warning system comprising: obstacle means associated with said tank on said vehicle and normally disposed in a position of obstruction adjacent said opening means operatively associated with said tank on said vehicle so as to prevent the connection of hose means between a second tank and said opening means associated with said vehicle tank and to prevent even the presence of a hose connection between a second tank and said opening means associated with said tank on said vehicle, said obstacle means being movable from said normal position of obstruction to a filling position where the area adjacent said vehicle tank opening means is relatively unobstructed and hose means can be conveniently operatively coupled and connected between said opening means associated with said tank of said vehicle and said second tank; signaling means disposed in the vicinity of the vehicle's cab where the same is readily discernible by an operator about to start the vehicle in motion, said signaling means including communicating warning means for directly communicating to the operator a warning in response to said signaling means being actuated; and actuating means operatively connected to said signaling means and responsive to said obstacle means assuming said filling position for selectively actuating said signaling means and said warning means thereof and consequently appraising the operator of the presence of a possible hose connection between the opening means operatively associated with the tank on said vehicle and said second tank, thereby preventing the inadvertent moving of the vehicle while there is a hose connection between the tank on aid vehicle and said second tank, wherein said vehicle includes a delivery hose reel assembly having a delivery hose and nozzle segment forming a nozzle end, and wherein a portion of said hose and nozzle segment comprises said obstacle means such that said hose and nozzle segment normally assumes a position of obstruction adjacent said opening means formed within the tank mounted on said vehicle so as to prevent the connection of hose means from said second tank with said opening means formed within the tank on said vehicle.

2. The safety warning system associated with said LP gas transport vehicle of claim 1 wherein said actuating means includes an electrical circuit having said signaling means electrically connected therein and further including switching means within said electrical circuit; and wherein adjacent said opening means operatively associated with said tank mounted on said vehicle there is provided receptacle means for receiving the nozzle end of said delivery hose and coupling the same nozzle and thereto in a position so as to actuate said switching means such that said electrical circuit is opened and said signaling means is normally in an inoperative state when the nozzle end of said delivery hose is properly coupled to said receiving means.

3. The safety warning system associated with the LP gas transport vehicle or the like of claim 2 wherein said signaling means comprises a flashing light source operatively connected in said electrical circuit.

4. The safety warning system associated with the LP gas transport vehicle or the like of claim 3 wherein said signaling means comprises an audible alarm source.

5. The safety warning system associated with said LP gas transport vehicle or the like of claim 2 wherein said signaling means comprises both a flashing light source and an audible alarm source, both operatively connected in said electrical circuit.

6. The safety warning system associated with said LP gas transport vehicle or the like of claim 1 wherein said actuating means comprises an electrical circuit having said signaling means operatively connected therein, and wherein said actuating means further includes an obstacle receiving receptacle disposed adjacent said opening means formed within said tank mounted on said vehicle and includes a normally closed switching means therein operatively connected in said electrical circuit; and wherein said obstacle receiving receptacle is adapted to receive said obstacle means therein in a coupled relationship therewith such that in said coupled relationship said obstacle means is operative to open said switching means within said obstacle receiving receptacle and consequently, place said signaling means in an inoperative state; and wherein said obstacle means when coupled with said obstacle receiving receptacle extends across and in close proximity to said opening means formed within said tank mounted on said vehicle to effectively prevent a hose from being connected between said opening means and said second tank or even the presence of an operatively connected hose between the two tanks.

7. The safety warning system associated with said LP gas transport vehicle or the like of claim 6 wherein said obstacle means includes an elongated rod having coupling means secured to one end thereof and adapted to couple with said obstacle receiving receptacle disposed adjacent said opening means formed within said tank mounted on said vehicle, said elongated obstacle rod extending across and in front of the opening means formed within said tank mounted on said vehicle.

8. In a LP gas transport vehicle of the type having a mobile chassis, a gas tank mounted thereon and having opening means operatively associated therewith for filling the tank, and a delivery hose reel assembly operatively connected to said tank and including a delivery hose with a nozzle segment disposed on a remote end of said delivery hose for delivering gas from said vehicle's tank to a customer's tank, the improvement comprising a safety warning system for appraising the vehicle's operator of a possible connection of the nozzle of said delivery hose with the customer's tank or the presence of hose means connected between a second tank and said opening means associated with said vehicle tank, and consequently enabling the operator to avoid the danger to human life and property damage that may result from moving the vehicle from the customer's tank while there is a hose connection therebetween, said safety warning system comprising: signaling means disposed in the vicinity of the vehicle where the same is readily discernible by an operator about to start the vehicle's engine, said signaling means including communicating warning means for directly communicating to the operator a warning signal in response to said signaling means being actuated; a nozzle receptacle mounted on said vehicle adjacent said opening means associated with said vehicle tank and including measns for receiving and holding said nozzle in an inoperative position, said nozzle being movable between an operative position where the same is disassociated with said receptacle to an inoperative position where the same is received and held by said receptacle; and actuating means operatively connected to said signaling means and including an electrical circuit for selectively actuating said signaling means, said actuating means including electrical switch means associated with said receptacle and responsive to the movement of said nozzle from said inoperative position to said operative position for closing said electrical circuit causing said signaling means to be actuated so as to directly communicate to the operator a warning signal and appraise the vehicle operator of a possible hose connection between the vehicle's tank and the customer tank; and wherein a portion of said delivery hose and said nozzle segment comprises obstacle means such that said hose and nozzle segment normally assumes a position of obstruction adjacent said opening means formed within the tank mounted on said vehicle when said nozzle is held by said nozzle receptacle so as to prevent the connection of hose means from a second tank with said opening means formed within the tank on said vehicle, such that when said nozzle segment is not connected to said nozzle receptacle said signaling means is actuated and the operator is appraised of the possibility of a hose connection between the tank mounted on said vehicle and a second tank, and wherein when said nozzle segment is connected to said nozzle receptacle it follows that because a portion of the delivery hose and the nozzle segment comprises an obstruction to said opening means that there is in fact no hose connection between the vehicle tank and a second tank.

* * * * *